March 1, 1932.  F. A. GERLING  1,847,828
AUTOMOBILE BRAKE
Filed July 17, 1930   2 Sheets-Sheet 1
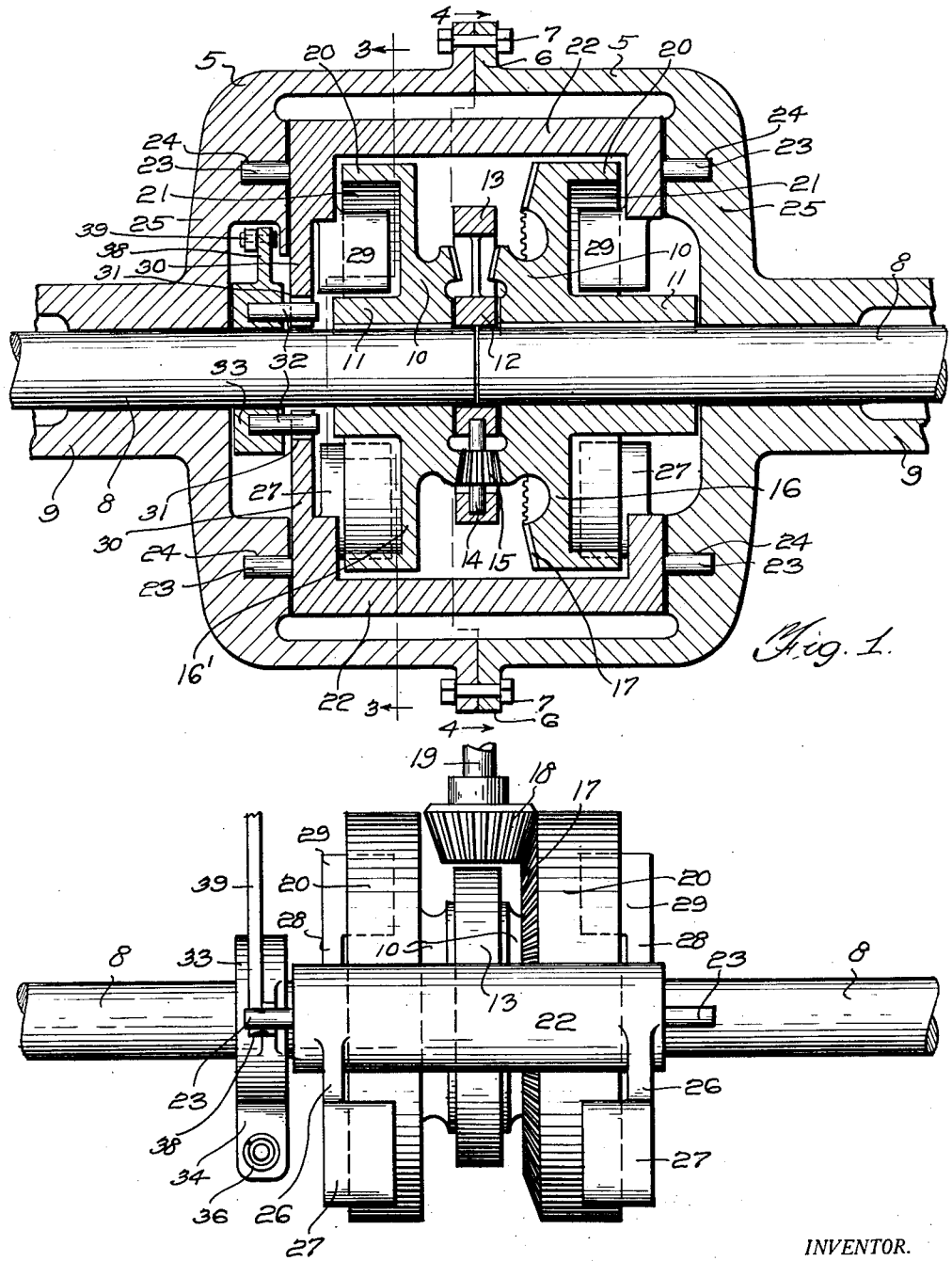
INVENTOR.
FRED A. GERLING,
BY
ATTORNEY.

March 1, 1932.  F. A. GERLING  1,847,828
AUTOMOBILE BRAKE
Filed July 17, 1930   2 Sheets-Sheet 2
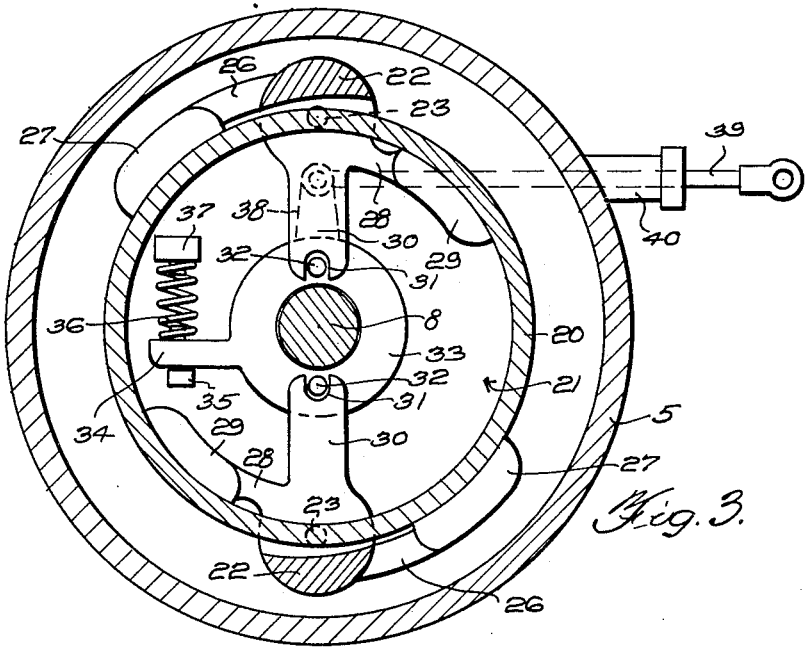
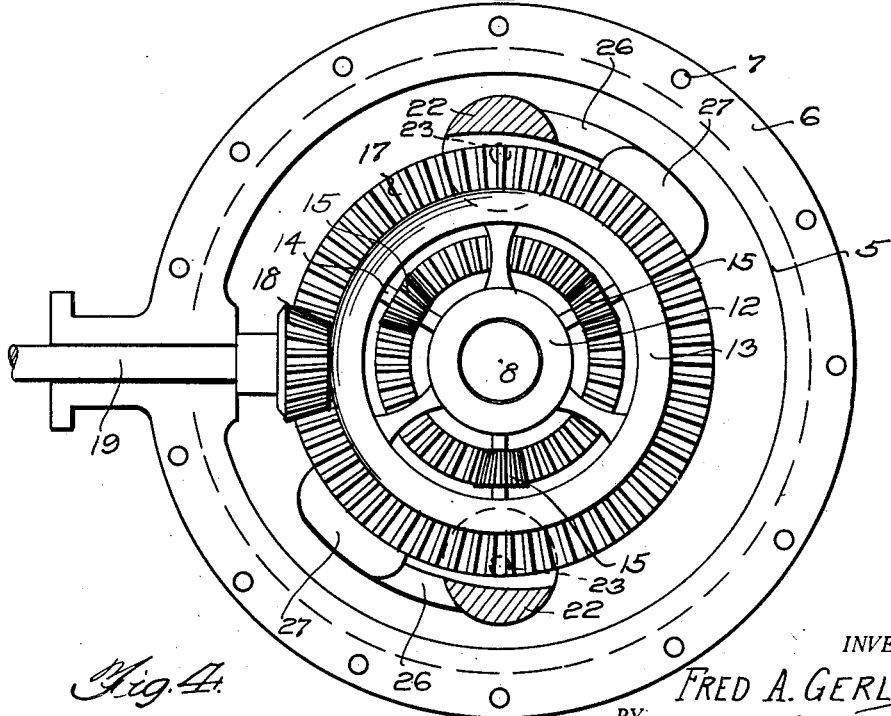
INVENTOR.
FRED A. GERLING,
BY
ATTORNEY.

Patented Mar. 1, 1932

1,847,828

UNITED STATES PATENT OFFICE

FRED A. GERLING, OF BOISE, IDAHO

AUTOMOBILE BRAKE

Application filed July 17, 1930. Serial No. 468,637.

My invention relates to improvements in brakes for automobiles or the like.

In accordance with my invention, I provide a brake mechanism which is applied to or embodied in the differential gearing. The sun gears of the differential gearing are provided with brake drums, and brake shoes are arranged to engage with the brake drums. The arrangement is preferably such that the brake shoes engage the inner and outer surfaces of the drums. The operating means for the brake shoes are arranged within the differential housing.

By the employment of my invention, I am able to eliminate the use of brake bands and the brake band lining. The mechanism eliminates chattering, and the braking force is applied with a powerful leverage in a regulated manner without liability of locking. The construction is strong and simple and reliable in operation. The lubricant employed for the gears of the differential gearing is also utilized for the brake shoes, eliminating quick gripping or locking. The differential casing is hermetically sealed, protecting the parts from dirt and dust and insuring constant lubrication. The number of parts are reduced to the minimum with the minimum wear upon the same.

In the accompanying drawings, forming a part of this specification, and in which like numerals are employed to designate like parts throughout the same, Figure 1 is a central vertical longitudinal section through the differential gearing embodying my invention, Figure 2 is a plan view of the operating parts, removed from the housing, Figure 3 is a transverse section taken on line 3—3 of Figure 1, and, Figure 4 is a central vertical longitudinal section taken on line 4—4 of Figure 1.

In the drawings, wherein for the purpose of illustration, is shown a preferred embodiment of my invention, the numeral 5 designates housing sections of the differential housing, having flanges 6 connected by bolts 7. The numeral 8 designates the rear axle sections leading into the differential housing, and held within the tubular axle housing sections 9.

The numeral 10 designates spaced sun gears having hubs 11 which are keyed or otherwise rigidly mounted upon the axle sections 8 for rotation therewith, and held against perceptible longitudinal movement. The sun gears are mounted within the differential housing, as shown, and receive therebetween the hub 12 of a planetary gear carrier 13. This hub is freely rotatable upon the inner ends of the axle sections 8, as shown. The planetary gear carrier has radial shafts 14, rotatable upon their axes, and carrying planetary gears 15, arranged between and engaging the sun gears 10, as shown.

One of the sun gears 10 is provided with a disc 16 and the other sun gear has a disc 16', extending radially beyond the same, and formed integral therewith. The disc 16 has an annular bevel gear 17, formed integral therewith, and engaged by a driving bevel gear 18 connected with the shaft 19, to be driven by the engine of the automobile, as is well known. Formed integral with the discs 16 and 16' are annular brake drums 20, which extend longitudinally outwardly beyond the discs 16 and 16', forming with the hubs 11 annular spaces 21. Arranged above and beneath the brake drums 20, at diametrically opposite points, are transverse horizontal rocker-yokes 22, provided at their ends with trunnions 23, rotatable within recesses 24, formed in the end walls 25 of the housing sections 5.

Formed integral with the opposite ends of each rocker-yoke 22 are outer circumferentially extending brake arms 26, integral therewith. The pairs of brake arms carried by the two rocker-yokes extend circumferentially in the same direction, as shown. The brake arms 26 are arranged exteriorly of and adjacent to the brake drums 20 and carry brake shoes 27, integral therewith, engaging the outer surface of the brake drums. Formed integral with the ends of each rocker-yoke 22 are inner circumferentially extending brake arms 28, the brake arms 28 of one rocker-yoke extending circumferentially in the same direction with the brake arms 28 of the other rocker-yoke. The brake arms 28 are arranged interiorly of the brake drums 20 and adjacent thereto, and carry brake shoes 29 integral with the brake arms 28 and these brake shoes 29 are arranged to engage the inner surface of the brake drums 20. The inner brake shoes 29 operate within the annular spaces 21.

The rocker-yokes 22 are provided at corresponding ends with inwardly projecting cranks 30, integral therewith and these cranks have slots 31 in their ends. These slots receive pins 32, rigidly mounted upon a rotary annular shifting element or ring 33, rotatably mounted upon one axle section 8. The shifting ring 33 has a radial arm 34 formed integral therewith and engaging above a stop lug 35, preferably cast upon the adjacent end wall 25 of the housing section 5. The crank 34 is forced downwardly by a compressible coil spring 36 engaging the stationary lug 37 also formed integral with the adjacent end wall 25. When the arm 34 engages the lug 35, the several brake shoes are in the released position. Formed integral with the shifting ring 33 is an upstanding radial arm or crank 38, having pivotal connection with a reciprocatory rod 39, extending through a stuffing box 40 or the like. The rod 39 is suitably connected with the brake pedal of the automobile.

Particular attention is called to the fact that all of the brake shoes and operating elements associated therewith are arranged within the differential gear housing, and are thus protected from dirt or the like, and are maintained thoroughly lubricated by the grease or other lubricant held within the differential housing. When the brake shoes are released, the sun gears are free to partake of the usual differential rotary motion. The brakes are applied by pulling the rod 39 forwardly, Figure 3, and this pulling movement need only be slight. When the rod 39 is moved forwardly, radial arm 38 is swung forwardly, Figure 3, turning shifting ring 33 clockwise. This movemnt of the shifting ring turns the cranks 30 in the same direction. Each crank 30 turns its rocker-yoke 22 upon the trunnions 23. This turning movement of each rocker-yoke brings the outer brake shoes 27 into engagement with the outer surface of the brake drums 20, while the inner brake shoes 29 are brought into engagement with the inner surfaces of the brake drums, thus effecting braking action.

It is to be understood that the form of my invention, herewith shown and described, is to be taken as a preferred example of the same, and that various changes in the shape, size and arrangement of parts, may be resorted to, without departing from the spirit of my invention, or the scope of the subjoined claims.

Having thus described my invention, I claim:—

1. The combination with differential gearing comprising a pair of sun gears, shaft sections connected with the sun gears, brake drums mounted upon the sun gears, a pivoted rocker-yoke extending transversely of the sun gears, brake shoes connected with the ends of the rocker-yoke and engaging the outer and inner surfaces of the drums, a crank connected with the rocker-yoke, a shifting element pivoted upon one shaft section and connected with the crank, and means to turn the shifting element.

2. A housing, differential gearing mounted within the housing including sun gears, brake drums secured to the sun gears, rocker-yokes pivoted within the housing and oppositely arranged and extending transversely of the sun gear, pairs of brake shoes connected with the opposite end of each rocker-yoke and engaging the inner and outer surfaces of said drums, inwardly extending cranks secured to the rocker-yokes, a shifting element connected with the cranks and mounted upon one shaft section, and means to turn the shifting element.

3. In apparatus of the character described, a housing, independently rotatable axle sections extending in the housing and arranged in concentric relation, spaced sun gears mounted upon the inner ends of the axle sections for rotation therewith, a planetary gear carrier arranged between the sun gears and rotatably mounted upon the inner end of one axle section, planetary gear or gears carried by the planetary gear carrier and engaging the sun gears, brake drums rigidly mounted upon the sun gears and having a greater diameter than the sun gears and disposed in concentric relation thereto, rocker-yokes pivoted within the housing and arranged near and extending across the peripheries of the brake drums, brake shoes connected with the ends of the rocker yokes and engaging the outer and inner surfaces of the brake drums, inwardly extending cranks connected with the rocker-yokes, a shifting element pivoted upon one axle section and connected with the cranks to turn the same, means to turn the shifting element, and means to drive one sun gear.

In testimony whereof I affix my signature.
FRED A. GERLING.